(12) United States Patent
Loranger et al.

(10) Patent No.: US 9,998,785 B2
(45) Date of Patent: Jun. 12, 2018

(54) VIDEO CACHING SYSTEM AND METHOD FOR A JUKEBOX

(71) Applicant: AMI Entertainment Network, LLC, Trevose, PA (US)

(72) Inventors: Richard M. Loranger, Chicago, IL (US); Charles Jaros, Chicago, IL (US); Ronald Richards, Elmhurst, IL (US)

(73) Assignee: AMI ENTERTAINMENT NETWORK, LLC, Trevose, PA (US)

( * ) Notice: Subject to any disclaimer, the term of this patent is extended or adjusted under 35 U.S.C. 154(b) by 0 days. days.

(21) Appl. No.: 14/936,823

(22) Filed: Nov. 10, 2015

(65) Prior Publication Data

US 2016/0134933 A1    May 12, 2016

Related U.S. Application Data

(60) Provisional application No. 62/077,745, filed on Nov. 10, 2014.

(51) Int. Cl.
| | | |
|---|---|---|
| *H04N 21/442* | (2011.01) | |
| *G06F 12/0875* | (2016.01) | |
| *H04N 21/433* | (2011.01) | |
| *H04N 21/4335* | (2011.01) | |
| *H04N 21/81* | (2011.01) | |
| *H04N 21/24* | (2011.01) | |
| *H04N 21/25* | (2011.01) | |
| *H04N 21/414* | (2011.01) | |

(52) U.S. Cl.
CPC ... *H04N 21/44204* (2013.01); *G06F 12/0875* (2013.01); *H04N 21/2402* (2013.01); *H04N 21/252* (2013.01); *H04N 21/41415* (2013.01); *H04N 21/4331* (2013.01); *H04N 21/4335* (2013.01); *H04N 21/8113* (2013.01); *G06F 2212/455* (2013.01)

(58) Field of Classification Search
None
See application file for complete search history.

(56) References Cited

U.S. PATENT DOCUMENTS

| | | |
|---|---|---|
| 7,113,999 B2 | 9/2006 | Pestoni et al. |
| 7,457,915 B2 | 11/2008 | Getzinger |
| 7,496,947 B1 * | 2/2009 | Meyers ............. H04N 7/17318 725/44 |
| 7,600,266 B2 * | 10/2009 | Thomas ........... G11B 20/00086 726/26 |
| 7,657,910 B1 | 2/2010 | McAulay et al. |
| 7,752,265 B2 | 7/2010 | Svendsen et al. |
| 7,886,068 B1 | 2/2011 | Rao et al. |
| 7,912,920 B2 | 3/2011 | Loomis et al. |
| 8,219,224 B2 | 7/2012 | Kalis |
| 8,688,674 B2 | 4/2014 | Carlson |

(Continued)

*Primary Examiner* — Cai Y Chen
(74) *Attorney, Agent, or Firm* — Panitch Schwarze Belisario & Nadel LLP

(57) ABSTRACT

Systems and methods for managing a plurality of videos associated with one or more of a plurality of communicably coupled jukeboxes over a network, are disclosed. A first digital jukebox of the plurality of communicably coupled jukeboxes, ranks the plurality of videos according to a predetermined criteria. Based, at least in part, on the ranking, the first digital jukebox determines whether to store a video of the plurality of videos in a temporary cache of the first digital jukebox.

18 Claims, 7 Drawing Sheets

(56) References Cited

U.S. PATENT DOCUMENTS

| | | | |
|---|---|---|---|
| 8,880,599 B2 | 11/2014 | Svendsen et al. | |
| 2008/0056075 A1* | 3/2008 | Kalis | G11B 27/034 369/30.05 |
| 2010/0269042 A1 | 10/2010 | Richards et al. | |
| 2013/0191857 A1* | 7/2013 | Guinn | H04H 20/38 725/24 |

* cited by examiner

VIDEO CACHING SYSTEM AND METHOD FOR A JUKEBOX

CROSS-REFERENCE TO RELATED APPLICATION

This application claims the benefit of U.S. Provisional Patent Application No. 62/077,745, filed on Nov. 10, 2014, entitled "Video Caching System and Method for a Jukebox," the entire contents of which are incorporated herein by reference.

BACKGROUND OF THE INVENTION

Traditionally, jukeboxes were large machines containing a collection of vinyl records or compact discs (CDs) and a record player or CD player to play songs selected by users. Because these jukeboxes were mainly located in public establishments, such as bars and restaurants, routinely updating conventional jukeboxes was a lengthy and cumbersome task, requiring servicemen to travel to each jukebox location to replace outdated recordings with up-to-date records or CDs.

The development of computer systems in jukeboxes provided a major advance in case of music management for jukeboxes because the songs in a jukebox are stored in digital format on a digital memory. Therefore, because jukeboxes no longer require cumbersome records or CDs, jukeboxes may be very small and may be located in a wide variety of public and private locations. Furthermore, jukeboxes are not limited to playing music, but may play songs, videos, and other forms of entertainment ("media content").

Jukeboxes may be linked to one or more servers, which can optionally be located remotely, to download media content. Accordingly, most types of media content are available over a network at one or more servers of a data center for play by a user, even if the selected media content is not stored locally on the jukebox at the time of selection. More specifically, if the selected media content is not already stored locally on the jukebox, it can be downloaded from the servers over the network. However, due to its comparatively larger size, video content may take a considerably long period of time to download to a local jukebox upon selection by a user. As such, it is advantageous for videos to be readily available for use in a local cache of the jukebox. However, the storage capacity of the cache of a jukebox may only accommodate a finite amount of media content. As such, an administrator of a jukebox must choose which videos and other types of media content to download to the local cache of the jukebox for immediate play upon selection by a user. Such choices may be made based on a current popularity of the media content. However, having a human administrator perform such tasks is time consuming and imprecise. Accordingly, there is a need for a video caching system for automatically downloading the most popular videos to a jukebox's cache.

SUMMARY OF THE INVENTION

Systems and methods for managing a plurality of videos associated with one or more of a plurality of communicably coupled jukeboxes over a network, are described. In one embodiment, a first digital jukebox of the plurality of communicably coupled jukeboxes, ranks the plurality of videos according to a predetermined criteria. Based, at least in part, on the ranking, the first digital jukebox determines whether to store a video of the plurality of videos in a temporary cache of the first digital jukebox.

In another embodiment, a first digital jukebox of the plurality of communicably coupled jukeboxes ranks the plurality of videos based at least in part on a local popularity metric associated with each video and a network popularity metric associated with each video. The local popularity metric corresponds to a local play frequency of media content locally on the first digital jukebox. The network popularity metric corresponds to the play frequency of the media content on one or more second digital jukeboxes of the plurality of communicably coupled digital jukeboxes. The media content includes at least one of a song, an artist, and a genre related to each video. Based, at least in part, on the ranking of the video, the first digital jukebox determines whether to store a selected video of the plurality of videos, in a temporary cache of the first digital jukebox.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE PREFERRED EMBODIMENTS

Figure 1:
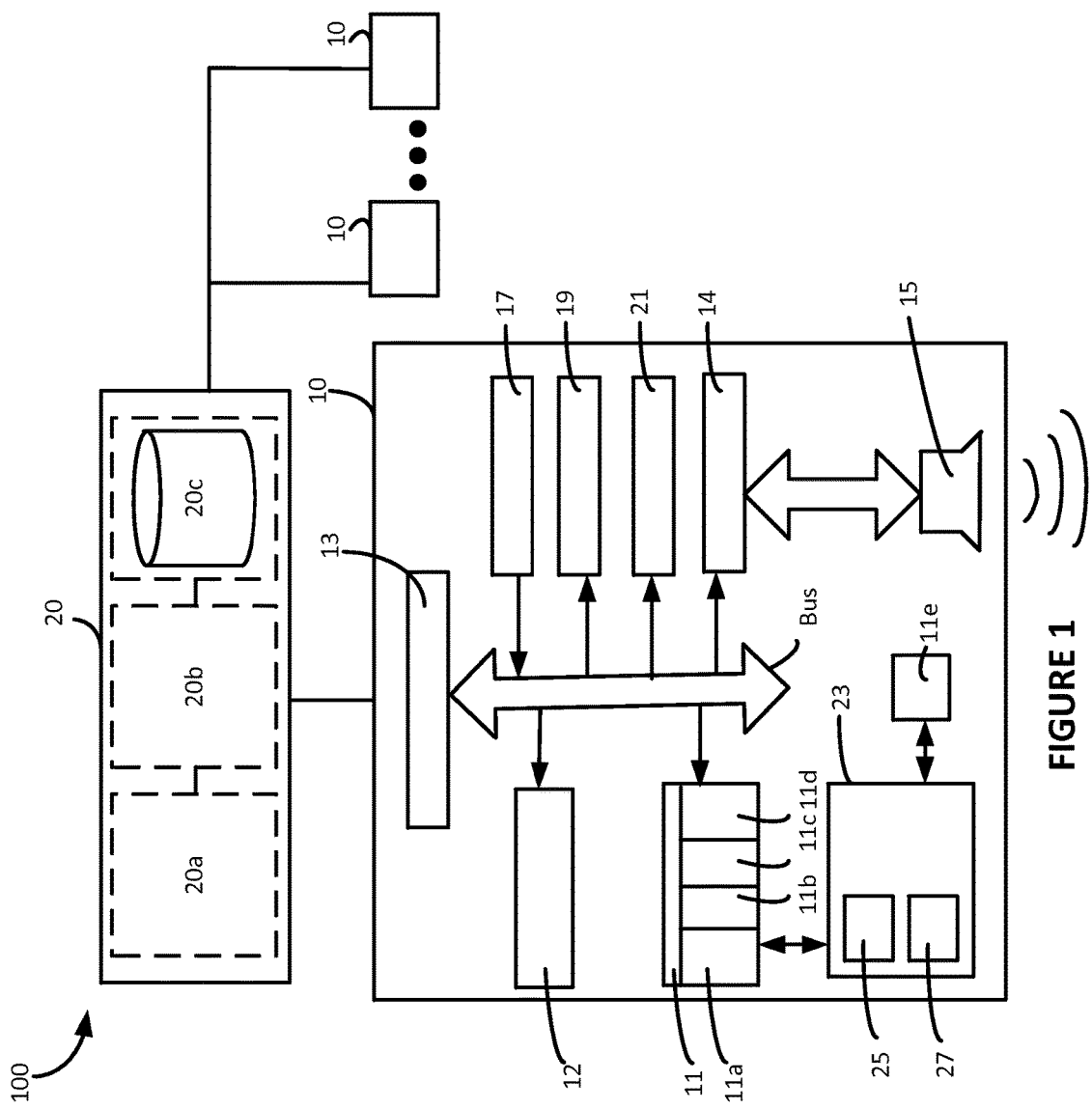
FIG. 1 is a schematic diagram of a video caching system as part of a network of jukeboxes according to an embodiment of the present invention.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

FIG. 1 shows an exemplary portion of a jukebox system 100 according to an embodiment of the present invention. The jukebox system 100 includes a jukebox 10 connected to a data center 20. The data center 20 may be a single computer server or multiple computer servers 20a, 20b, 20c, each of which include all necessary computer parts for receiving, sending, and processing information (e.g., central processing unit(s), hard drive(s), random access memory, motherboard, and the like) to the jukebox 10 and optionally multiple other jukeboxes 10 also connected to the data center 20 over the network. When multiple servers 20a, 20b, 20c are used, each may provide particularized functions, such as communicating with the computer jukebox 10, storing digital music files that can be downloaded by the computer jukebox 10, and storing a database containing information necessary for managing the jukebox 10. The database may contain information for calculating billing and/or royalty payments. The data center 20 may be one centrally located data center, a plurality of data centers, a series of regional data centers, or a combination of centrally located and regional data centers.

The jukebox 10 includes at least one digital memory 11 for storing a plurality of digital music files and information relating to the stored music files. The digital memory 11 can include a hard drive, a collection of hard drives, or any other type of memory capable of storing digital music files (e.g., RAM, DVD-RAM, DVD-RW, CD-RW, memory stick, memory cards (CF, SD, XD), jump drive, mp3 player, personal digital assistant, and cell phone). The digital memory 11 can optionally include a cache 11a and various data stores including a network data store 11b, music data store 11c, and a jukebox catalog data store 11d. The cache 11a and the various data stores, 11b, 11c, 11d may be physically separated or merely designated as separate storage sites. An additional hard drive 11e, known as the content drive, may also reside in the jukebox 10, in which the music video files and associated image files are located.

The jukebox 10 also has a display 21, which may display graphics, such as album covers, videos, or images, and also displays text, such as selection instructions and song titles. The display 21 may be in the form of a touch-screen, such that a user can make his selections by pressing points on the display 21. Alternatively, a user or administrator may enter selections or otherwise interact with the jukebox 10 using a user input device 19, which may include a keyboard, mouse, stylus, the display 21, or any other device capable of inputting information into the jukebox 10.

The jukebox 10 can also have a processor 12, a communication interface 13, and an audio output unit 14 coupled to at least one speaker 15 for replaying the songs. Speaker 15 may optionally be replaced by headphones, including but not limited to one or more wireless headphones, for private listening by one or more users. The audio output unit 14 may optionally be coupled to a wireless transmitter for transmission of the audio signal to a plurality of wireless audio receivers (not shown). The audio output unit 14 may include an audio card, a digital-to-analog converter, and means for decompressing compressed, digital files. The processor 12 may perform a variety of functions, including transferring the songs from the digital memory 11 to the audio output unit 14. The processor may also store information to the digital memory 11 to compile a database containing the number of times that each song is played on the jukebox 10.

The jukebox 10 may optionally include a money detector 17, such as a coin, bill, and/or credit card acceptor. The money detector 17 can include a device for electronic detection of a source of credit or money, such as a credit card or a device with a barcode, RFID tag, or any means for transferring payment information to computer jukebox 10.

It should be noted that the jukebox 10 may include other components and modules necessary to perform other functions associated with a jukebox. For example, other components and modules may be included to employ the jukebox menu navigation system as described in U.S. patent application Ser. No. 12/764,605, filed Apr. 21, 2010, the contents of which are incorporated herein in their entirety.

The jukebox 10 also includes a video cache system ("VCS") 23 for management of the videos in the digital memory 11, and downloading of videos into the cache 11a. The VCS 23 includes a video cache manager ("VCM") 25 and a network statistics module ("NSM") 27. It should be noted that the various data stores may be a part of, or separate from the VCS 23. The NSM 27 uses network metrics to determine when to perform caching operations. Such network metrics include, but are not limited to, overall network data usage, network data usage for each video file download, and network data usage for each video image file download, each of which can be preferably measured in bytes per month. However, other units of measurement are contemplated in keeping with the spirit of the invention.

The NSM 27 includes logging functionality that monitors network traffic on network adapters in the jukebox. At preferably five minute time intervals, the NSM 27 computes a total count of bytes sent and received over the network adapters for the previous time interval. It should be noted that time intervals of other predetermined durations can be used as well. Such network traffic computations are stored as fields in a network traffic table in the network data store. Other network traffic data is stored in the network traffic table as well, an example of which is shown in the representative network traffic table below:

| NETWORK TRAFFIC TABLE | | |
|---|---|---|
| FIELD NAME | DATA TYPE | DESCRIPTION |
| start_time | Date/Time | The starting date/time for the sample interval. |
| end_time | Date/Time | The ending date/time for the sample interval. |
| bytes_sent | Integer, 64-bit signed | Count of network bytes sent during sample interval. |
| bytes_received | Integer, 64-bit signed | Count of network bytes received during sample interval. |
| bytes_total | Integer, 64-bit signed | Total bytes sent and received during the sample interval. |

The NSM 27 includes a network statistics handler (not shown) configured to store and retrieve network usage data related to video caching operations. For example, the network statistics handler retrieves and logs video download network usage data for storage in one or more tables in the network data store 11b. Such video download network usage data includes details of each video download, such as a start time of each download, end time of each download, the size of each downloaded file, the time (e.g., in seconds) to complete each download, and the type of download (e.g., video media file, video image file, and the like). A summary of such usage data is shown in the table below:

| VIDEO DOWNLOAD TABLE | | |
|---|---|---|
| FIELD NAME | DATA TYPE | DESCRIPTION |
| start_time | Date/Time | The start date and time of the download operation. |
| EndTime | DateTime | The end date and time of the download operation. |
| FileSize | Integer, 64-bit signed | The size of the downloaded file in bytes. |

-continued

VIDEO DOWNLOAD TABLE

| FIELD NAME | DATA TYPE | DESCRIPTION |
| --- | --- | --- |
| ElapsedSeconds | Floating Point | The total number of seconds to complete the download. |
| DownloadType | Integer, 32-bit signed | Indicates the type of download operation:<br>0 - Speed Test<br>1 - Video media file download<br>2 - Video image file download<br>3 - Interrupted operation |

The network statistics handler retrieves a list of network statistics records containing network metrics derived from the above network traffic and video download tables. Each network statistic record contains the following information:

| PARAMETER | DATA TYPE | DESCRIPTION |
| --- | --- | --- |
| PeriodStart | DateTime | The starting date/time for the current billing period. This value is calculated based on the user-supplied billing period start date. |
| PeriodEnd | DateTime | The ending date/time for the current billing period. This value is calculated based on the user-supplied billing period start date. |
| AverageSpeed | Floating Point | The average download speed in kilobytes/second for the current billing period. |
| LastTestSpeed | Floating Point | The average download speed for the last speed test in kilobytes/second. |
| BytesUsed | Floating Point | The total network data usage for the current billing period in Megabytes. This value is calculated using data stored in the NetworkTraffic table. |
| BytesAvaiable | Floating Point | The remaining network bandwidth available for the current billing period in Megabytes. |
| BandwidthLimit | Floating Point | The user-supplied bandwidth limit for the billing period in Gigabytes. |
| NonEssentialBytesUsed | Floating Point | The total network data usage consumed for video caching operations for the current billing period in Megabytes. This data is calculated using records from the VideoDownload table that have their DownloadType field set to either 1 (video media file download) or 0 (video image file download). |
| NonEssentialBytesAvailable | Floating Point | The remaining network bandwidth available for video caching operations for the current billing period in Megabytes. This value is calculated using the methodology described in section 2.1.2.2.2 below. |

As discussed in the above table, the billing period is calculated based on a user-supplied value that indicates the starting day of the month for the billing period, and may consist of any predetermined period of time starting and finishing on any day. By way of non-limiting example only, the billing period may run from 12:00 AM on the starting day through 11:59:59 PM on the day immediately prior to the starting day for the following month.

According to an embodiment of the present invention, available non-essential bandwidth may be calculated for each billing period. For each of the previous three billing periods, the NSM 27 calculates a number of essential bytes used. More specifically, the NSM 27 subtracts the total non-essential bandwidth usage (e.g., from the network statistics table) from the total bandwidth usage (e.g., from the video downloads table) for the billing period. If such bandwidth usage records are not available from the tables (e.g., for a least half of the total available days during the billing period), then a default value may be used to represent the count of essential bytes for the billing periods). The default value may be set to any size, such as, for example 1.7 gigabytes.

An average non-essential bandwidth is determined by calculating the average non-essential bandwidth values for each of the three billing periods calculated above. Lastly, an available non-essential bandwidth for a current billing period is determined by subtracting the average essential bandwidth usage from a user-supplied total bandwidth limit.

Figure 2:
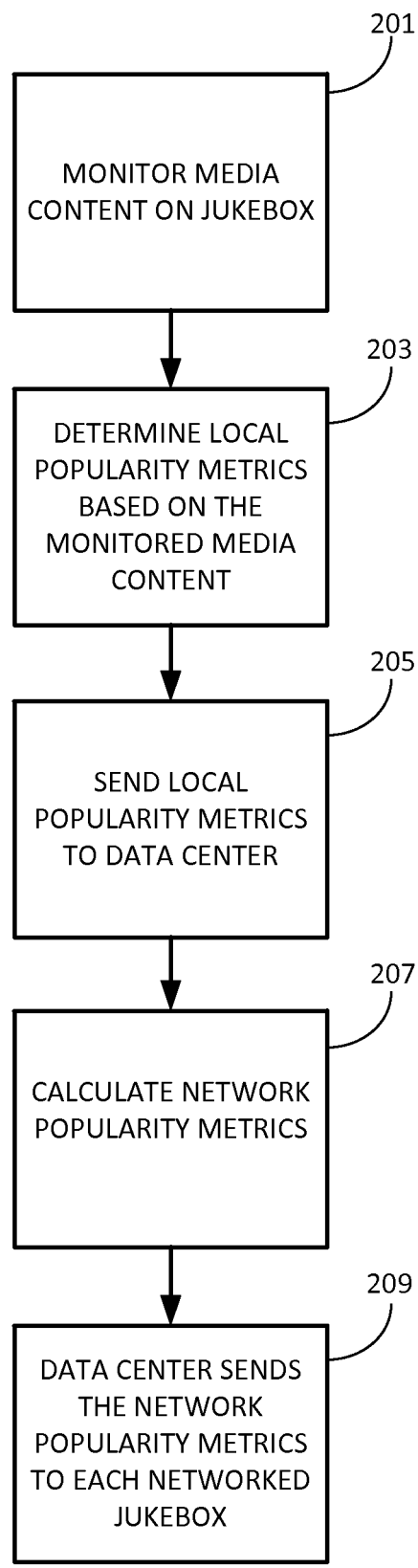
FIG. 2 is a flowchart of blocks for determining current video popularity, according to an embodiment of the present invention.

According to an embodiment of the present invention, the jukebox catalog 11d monitors and stores media content information including but not limited to, what media is available on the jukebox, popularity metrics for the media, and file system data about the media that has been locally cached. Such media content information is used to determine current video popularity, an exemplary method of which is depicted in FIG. 2, according to an embodiment of the present invention. The jukebox catalog may also contain a listing of content available on the jukebox network (e.g., content available locally on the jukebox or in the data center 20). This complete network listing may be referred to as the network catalog.

Turning now to FIG. 2, at block 201, media content is monitored. More specifically, the jukebox catalog 11d continuously logs songs and videos played on the jukebox. Based on such logged content, at block 203, the jukebox catalog 11d determines local popularity metrics. As used herein, local popularity metrics of a video may include popularity of a song, artist, and genre associated with the video stored locally on the jukebox. At block 205, the local popularity metrics for each jukebox are sent to the data center 20 over the network, where the metrics are recorded. At block 207, the data center 20 calculates network popularity metrics for each video. As used herein, network popularity metrics may include popularity of a song, artist, and genre associated with a particular video compared to the videos stored in all jukeboxes 10 coupled to the network. The data center 20 may calculate the network metrics at any predetermined time interval. For example, the data center 20 may calculate a video's network popularity metrics on a daily basis, weekly basis, or any other time period. At block 209, the data center 20 sends the network popularity metrics to each jukebox 10 connected to the network, where the network popularity metrics are then locally stored (e.g., in the jukebox catalog 11b digital memory 11) of each of the respective jukeboxes 10.

Video Cache Selection Process

Figure 3:
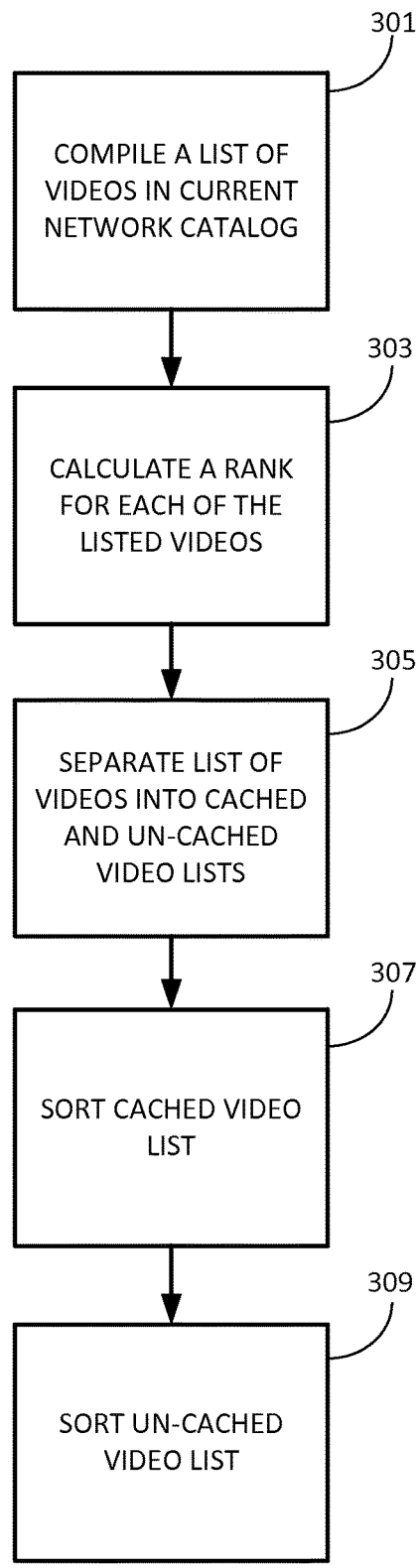
FIG. 3 is a flowchart of blocks for determining which videos should be downloaded to, or removed from, the jukebox cache, according to a preferred embodiment of the present invention.

Referring now to FIG. 3, an exemplary method of determining which videos should be downloaded to the cache, or removed from the cache (e.g., when the available space in the cache has been exceeded), according to an embodiment of the present invention is depicted. At block 301, the VCM 25 compiles a list of videos currently stored in the network catalog. At block 303, for each of the listed videos, a rank is calculated (e.g., using a ranking algorithm) using predetermined criteria, such as the local and network popularity data discussed above. The ranking algorithm is preferably structured such that a video ranking is directly proportional to the projected or computed popularity of a video on a particular jukebox. Stated differently, the more popular the video, the higher the ranking of the video. Details of the ranking algorithm are described below. At block 305, the list of videos is separated into two additional lists according to whether or not the video is currently stored in the jukebox's cache 11a. More specifically, those videos currently stored in the jukebox's cache 11a are placed in a "cached" list. Alternatively, those videos not currently stored in the jukebox's cache 11a (e.g., those videos stored elsewhere locally in the memory 11e, on other jukeboxes 10 over the network or in the data center 20) are placed in an "un-cached" list. Each of the un-cached and cached lists of videos is then sorted according to rank. For example, at block 307, the list of un-cached videos is sorted in descending order according to the rank of each video calculated by the ranking algorithm. Therefore, the highest ranked un-cached video (i.e., the most popular un-cached video) will be located at the top of the un-cached list. At block 309, the list of cached videos is sorted in ascending order according to the rank of each video calculated by the ranking algorithm. Therefore, the lowest ranked cached video (i.e., the least popular cached video) will be located at the top of the cached list. It should be noted that blocks 307 and 309 may occur in any order or substantially simultaneously.

Ranking Algorithm

Figure 4:
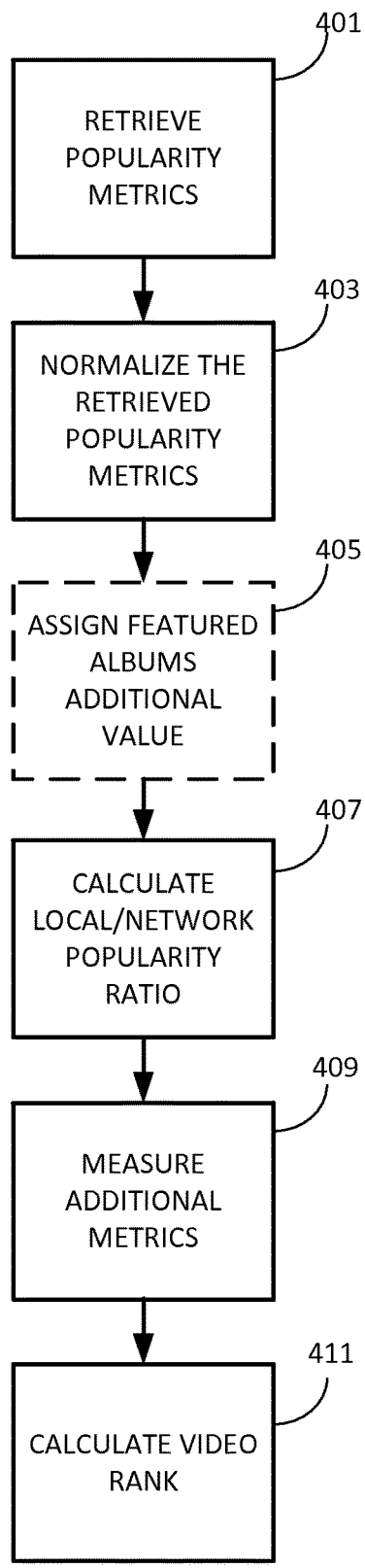
FIG. 4 is a flowchart of blocks for determining a ranking of a video, according to a preferred embodiment of the present invention.

Embodiments of the present invention employ a ranking algorithm to predict the popularity of a video on a particular jukebox. By considering various factors, the ranking algorithm computes a projection of such future popularity of a given video. Accordingly, and as discussed above, the projection of future popularity of videos is used to determine videos to be downloaded to, or removed from, the jukebox cache 11a. The ranking algorithm is depicted in FIG. 4, according to an embodiment of the present invention. At block 401, the VCM 25 retrieves popularity metrics (e.g., local and network popularity metrics) from the jukebox catalog 11d. Such popularity metrics include, but are not limited to: local song popularity ("$P_{song}$"), local artist popularity ("$P_{Artist}$"), local genre popularity ("$P_{Genre}$"), network song popularity ("$N_{song}$"), network artist popularity ("$N_{Artist}$"), network genre popularity ("$N_{Genre}$"), and network video popularity ("$N_{video}$").

At block 403, the VCM 25 normalizes the retrieved popularity metrics across all videos such that each popularity metric is represented on a scale of 0-100%, with the most popular category (e.g., local song, local artist, and the like) of each metric represented as 100%. On occasion, an album may be featured on one or more of the jukeboxes on the network, as indicated by a network librarian associated with the network of jukeboxes. A featured album may effect an increase in the popularity of a video associated with the featured album. As such, videos associated with featured albums in the jukebox catalog are assigned an additional metric called "featured popularity" ("$P_{Featured}$"), which may serve to reflect a projected increase in the popularity of such an associated video. For example, optionally at block 405, videos associated with featured albums are assigned a value of 66% (although other percentages may be used as well). Next, at block 407, the VCM 25 calculates a ratio ("$R_{Genre}$") of local genre popularity ("$P_{Genre}$") to network popularity ("$N_{Genre}$"). Such a ratio may be calculated according to the formula: $R_{Genre}=P_{Genre}/N_{Genre}$. From this ratio, additional metrics are measured at block 409, which include, but are not limited to: an adjusted network song popularity ("$A_{song}=N_{song}\times R_{Genre}$"), an adjusted network artist popularity ("$A_{Artist}=N_{Artist}\times R_{Genre}$"), an adjusted network video popularity ("$A_{Video}=N_{Video}\times R_{Genre}$"), and an adjusted network featured popularity ("$A_{Featured}=P_{Featured}\times R_{Genre}$").

In light of the disclosure, one of skill in the art may appreciate that one or more the above discussed metrics may be more significant to the popularity of a video. Embodiments of the present invention take such variations of significance into consideration by weighting the popularity metrics. More specifically, the video caching system applies weighting constants to each of the aforementioned popularity metrics. For example, the popularity of a song already stored locally on a jukebox (i.e., $K_{song}$) may weigh more heavily on the overall ranking of the video than the popularity of a genre of a song already stored locally on a jukebox (i.e., $K_{Genre}$). As such, the video caching system applies a weighting constant=100 to $K_{song}$, and a weighting constant=0 to $K_{Genre}$. An exemplary table of weighting constants, which may be applied to respective popularity metrics, is shown below:

| WEIGHTING CONSTANT | RANGE | VALUE | DESCRIPTION |
| --- | --- | --- | --- |
| $K_{Song}$ | 0-100 | 100 | Local song popularity weight |
| $K_{Artist}$ | 0-100 | 33 | Local artist popularity weight |
| $K_{Genre}$ | 0-100 | 0 | Local genre popularity weight |
| $K_{NetSong}$ | 0-100 | 1 | Network song popularity weight |
| $K_{NetArtist}$ | 0-100 | 1 | Network artist popularity weight |
| $K_{NetVideo}$ | 0-100 | 5 | Network video popularity weight |
| $K_{AdjSong}$ | 0-100 | 10 | Genre adjusted network popularity weight |
| $K_{AdjArtist}$ | 0-100 | 10 | Genre adjusted network artist popularity weight |
| $K_{AdjVideo}$ | 0-100 | 33 | Genre adjusted network video artist popularity weight |
| $K_{Featured}$ | 0-100 | 55 | Feature videos weight |
| $K_{AdjFeatured}$ | 0-100 | 33 | Genre adjusted Featured videos weight |

It should be noted that the above list is by way of non-limiting example only. As such, each of the above listed constants may be assigned different values. Moreover, additional weighting constants may be implemented in still keeping with the spirit of the invention. Additionally, it may be advantageous to ensure that videos associated with songs flagged as part of a jukebox's local music collection be cached before videos not associated with the local music collection. Accordingly, such videos associated with locally stored songs may have a comparatively large value added to its rank (e.g., 2,000,000).

With the above determined popularity metrics and weighting constants, at block 411, the VCM preferably calculates a rank according to the following formula:

$$\text{Rank} = (P_{Song} \times K_{Song}) + (P_{Artist} \times K_{Artist}) + (P_{Genre} \times K_{Genre}) + (N_{Song} \times K_{NetSong}) + (N_{Artist} \times K_{NetArtist}) + (N_{Video} \times K_{NetVideo}) + (A_{Song} \times K_{AdjSong}) + (A_{Artist} \times K_{AdjArtist}) + (A_{Video} \times K_{AdjVideo}) + (P_{Featured} \times K_{Featured}) + (A_{Featured} \times K_{AdjFeatured}).$$

It should be noted that the above formula is by way of non-limited example only. As such, other factors, and expressions and values reflecting other factors, may be incorporated into the above formula. Further, some of the factors, expressions, and values listed in the above formula may be modified or removed from the above formula in still keeping with the spirit of the invention. Some additional factors that may be incorporated in the ranking algorithm are described in more detail below.

Additional Ranking Factors

It should be noted that the above discussed factors incorporated in computing a projected rank are by way of non-limiting example only, and other factors may be added to the computation of the projected popularity rank in still keeping with the spirit of the invention. For example, the fact that a video may be designated as a feature may be taken into consideration. A network recency factor may be incorporated as well. More specifically, the network recency factor may be computed based on a length of time the video has been released on the jukebox network. Such a factor can be used to counteract any lack of network popularity available for a newly released hit by a popular artist. A release recency factor may be also be incorporated. More specifically, the release recency factor may be computed based on a length of time a video has been released to the world (otherwise known as the "street date"). Similar to the above discussed network recency factor, the release recency factor may be employed to boost new releases by popular artists.

The ranking algorithm may also consider certain artists favored by patrons of a particular jukebox. For example, patrons may manually designate (e.g., on the jukebox) an artists they particularly favor. Such a favored setting, or option, could be designated during setup of a particular jukebox. Accordingly, such favored artists may get a comparatively large increase in their ranking, akin to an increase applied to videos associated with locally stored songs, as discussed above.

An owner of a jukebox may manually provide a designation on the video itself. For example, the owner may flag a video that is available in the jukebox library, and provide a designation reflecting that the video should be downloaded to the jukebox. Such a designated video would also get a dramatic ranking boost similar to videos associated with locally stored songs.

Another factor that may be considered relates to patron video requests. For example, patron requests for a particular video may be tracked and aggregated based, at least in part, on indications sent from patrons using a user interface, such as the jukebox user interface or a mobile application or "app", (such as AMI's BARLINK application), on a computing device. As used herein, a computing device may refer to a smart phone, a tablet, an e-reader, a mobile gaming console, a personal computer, an mp3 player, an iPod or any other device capable of interfacing with a network of jukeboxes. In some embodiments, ranking may also consider, as a factor, requests based on selections of the patrons of other jukeboxes. For example, in the instance that a patron makes a selection on a particular jukebox, the patron's previous requests (e.g., at other networked jukeboxes) may also be considered.

Embodiments of the present invention are not limited to the above discussed factors. For example, other factors may be instituted into the ranking algorithm in still keeping with the spirit of the invention.

Video Manifest

As discussed above, music video files and their associated image files are stored on a content drive 11e separate from the rest of the content for the jukebox. In other embodiments, the video files an image files are stored on the same physical drive, but may be logically partitioned. Also stored on the content drive is a manifest which provides metadata information for all of the videos. The purpose of the manifest is to provide catalog information (including decryption keys for the video files) for the videos stored on the content drive so that content drives may be freely transferred between networked jukeboxes 10.

Each video file on the jukebox 10 has an entry in the manifest that is kept up to date with jukebox catalog changes and caching information. Additionally, there is a metadata entry for the manifest as a whole that contains a hash code for the manifest and the catalog version against which the manifest was built. All metadata information for the videos is stored as encrypted string information in the manifest with the exception of the manifest metadata (e.g. hash code and catalog version), which is stored as plain text.

The manifest is updated discretely as video and image files are downloaded and deleted during caching operations. The manifest is rebuilt as a whole whenever a new catalog is received from the server and integrated into the local jukebox database. Such manifest information is stored as follows:

| FIELD | DATA TYPE | DESCRIPTION |
| --- | --- | --- |
| ID | Integer, 32-bit signed | The catalog ID for the video |
| MediaFile | String, UTF-8 encoding | The name of the video file |
| ImageFile | String, UTF-8 encoding | The name of the video image file |
| MediaFormat | String, UTF-8 encoding | The media format (e.g. XVID, AVI, etc.) |
| MediaType | String, UTF-8 encoding | The media type (e.g. VID, AUD, etc.) |
| Version | Integer, 32-bit signed | The version number for the video |
| ImageVersion | Integer, 32-bit signed | The version number for the video image |
| PLine | String, UTF-8 encoding | The publisher line |
| ReleaseDate | Date/Time | The release date for the video |
| EncryptionMethod | String, UTF-8 encoding | The encryption method that was used to encrypt the video file |
| ScramblerIndex | Integer, 32-bit signed | The index of the scrambler used for the scrambled key |
| ScrambledKey | String, UTF-8 encoding | The scrambled encryption key for the video file |

Video Manifest Hash Code

A hash code for the video manifest is generated by creating a large text string of all of the ID and version information for the videos on the content drive. The specific method used is as follows:
1. For each video entry in the current catalog compose a string (UTF-8 encoding) based on the following rules:
   a. If the image file for the video has been downloaded use the following pattern: "<ID>-<Version>-<Image Version>"

b. If the image file for the video has not been downloaded then use the following pattern: "<ID>-<Version>"
2. Sort the list of strings obtained in step 1 in ascending alphabetical order.
3. Convert each string from step 2 to a byte-array representation and store the result in a memory buffer.
4. Compute the hash code using the MD5 hashing algorithm with the memory buff from step 3 as the input.

Because the hash code is derived from catalog information stored in the jukebox catalog 11d, it can be re-computed at any time and compared with the hash code that is stored in the manifest on the content drive 11e. Any differences between the hash code from the manifest and the hash code computed from the jukebox catalog 11d will indicate that the content drive 11e is out of sync with the jukebox catalog 11d, which may be due to its being a content drive 11e that was transferred from another jukebox 10. When this condition is detected, the jukebox 10 will read all of the catalog information from the manifest on the content drive 11e and update its jukebox catalog 11d to bring the jukebox catalog 11d back into sync with the music video content that is available on the content drive 11e.

Video Cache Timing

According to embodiments of the present invention, the VCM 25 is configured to operate on one or more jukeboxes supporting music video playback, and is automatically initiated upon startup of the jukebox. Even though the VCM 25 is initiated upon jukebox startup, video caching operations as discussed hereinthroughout commence upon cache timing requirements being satisfied. For example, a timer running on regular time intervals (e.g., one-minute intervals) starts upon activation of the VCM 25. Upon expiration of this timer, the VCM 25 determines whether cache timing requirements are met. Such cache timing requirements preferably include the following: (1) there are no video caching download operations currently in progress, (2) there are no video cache maintenance operations currently in progress, (3) the jukebox has a broadband network connection to the network, (4) the music video playback has been enabled by the jukebox, and (5) there is non-essential bandwidth available for the current billing period.

Figure 5:
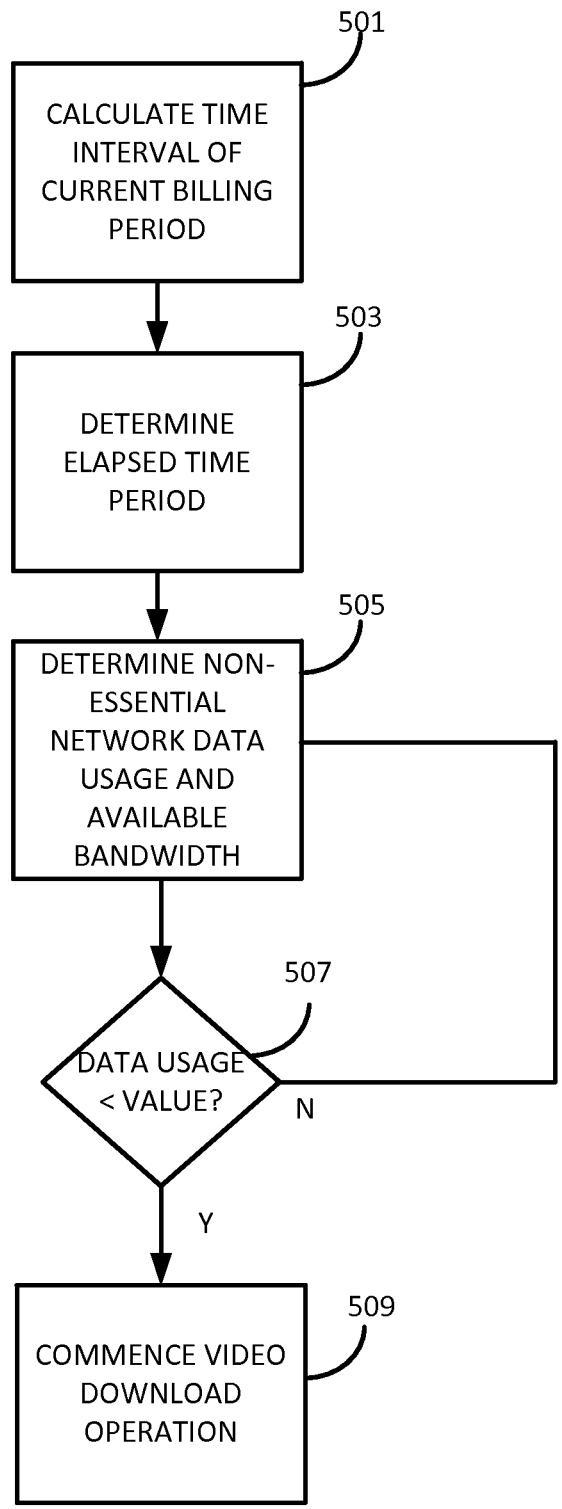
FIG. 5 is a flowchart of blocks for determining whether it is time to download a video to the jukebox cache, according to a preferred embodiment of the present invention.

If the above requirements are satisfied, the VCM 25 determines whether it is time to download a video to the jukebox cache. For example, referring now to FIG. 5, at block 501, a total number of minutes in a current billing period ($T_{Period}$) is calculated. At block 503, the current date and time are used to determine a period of time (e.g., minutes) elapsed in the current billing period ($T_{Lapsed}$). At block 505, network statistics are retrieved (such as from the network statistics retrieval technique discussed above). This method is employed to determine the count of non-essential network data usage for the current billing period ("$NE_{Used}$"); and the available non-essential network bandwidth remaining for the current billing period ("$NE_{Available}$"). Next, at block 507, $NE_{Used}$ is compared to the value of the expression: $((T_{Elapsed}/T_{Period}) \times NE_{Available})$. If $NE_{Used}$ is less than $((T_{Elapsed}/T_{Period}) \times NE_{Available})$, the video caching download operation commences at block 509.

Figure 6:
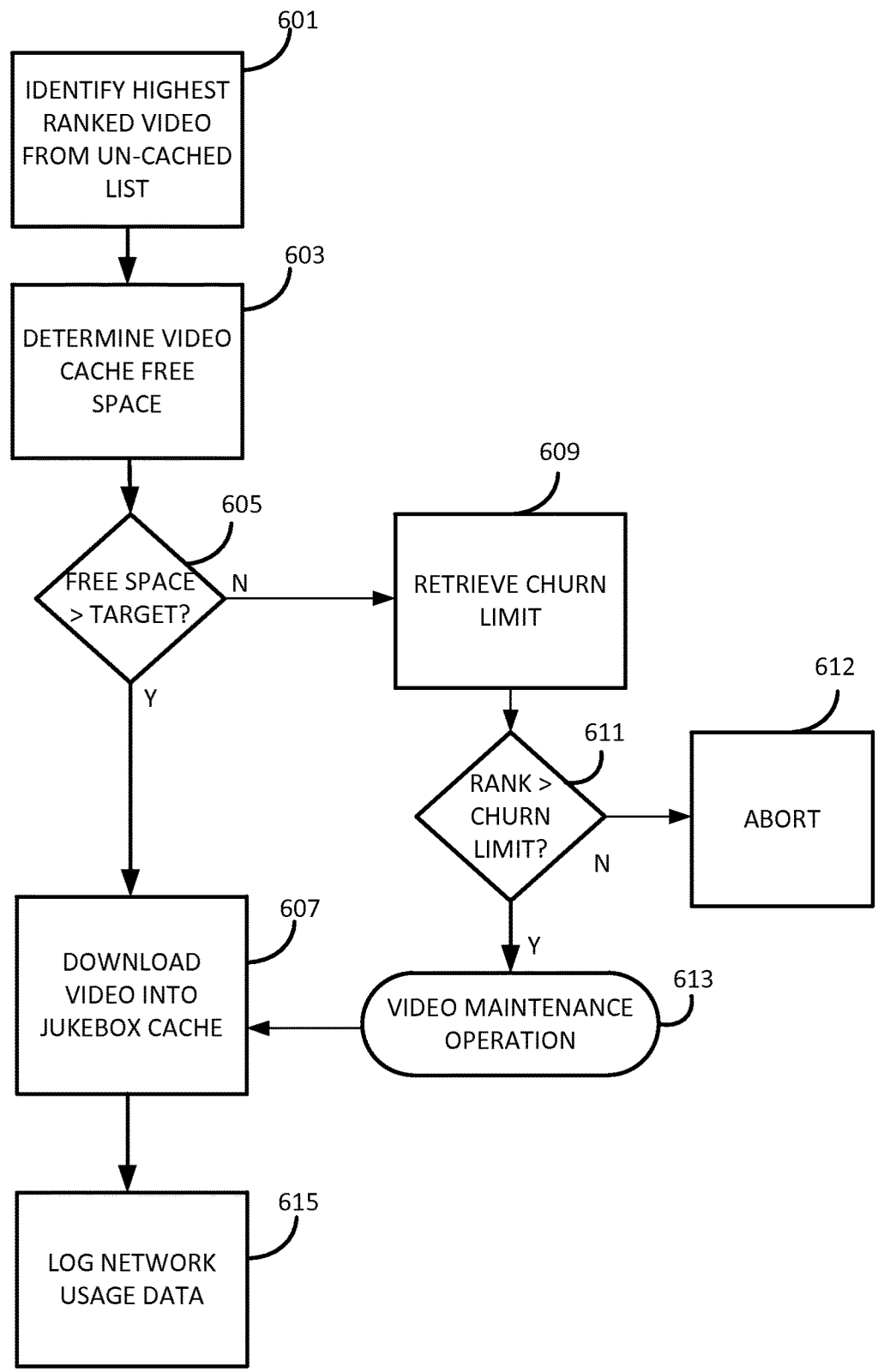
FIG. 6 is a flowchart of blocks for downloading a video into the jukebox cache, according to a preferred embodiment of the present invention.

Referring now to FIG. 6, an exemplary method of downloading a video into the jukebox cache is depicted. At block 601, the video cache selection process, as described above in connection with FIG. 3, is initiated, from which the highest ranked video from the un-cached selection list is identified. At block 603, an amount of available free space on the jukebox cache 11a is determined. At block 605, the amount of cache free space is compared to a predetermined target free space size, which may represent a desired available amount of free space for downloading additional media content. If the amount of cache free space is greater than the target free space size, the video from the un-cached selection list is downloaded into the jukebox cache 11a, at block 607. If the amount of available cache free space is less than the target free space size, then, at 609, a churn limit value is retrieved from the jukebox configuration data. At block 611, the rank of the video from the un-cached selection list is compared to the churn limit value. If the rank is less than the churn limit value, the video is deemed to be not popular enough for downloading to the jukebox cache 11a, and the process is aborted at block 612. If the rank of the video is greater than the churn limit value, a video cache maintenance operation is performed at block 613 (details of which are described below with respect to FIG. 7). Upon completion of the video cache maintenance operation, the video is downloaded into the jukebox cache 11a.

Upon successful download of the video, at block 615, network usage data for the successful download is logged in the video downloads table as discussed above. Although not shown in FIG. 6, the video manifest on the content drive is updated with the information for the downloaded video file, and a new hash code for the manifest on the content drive is generated and stored.

Video Cache Maintenance

Figure 7:
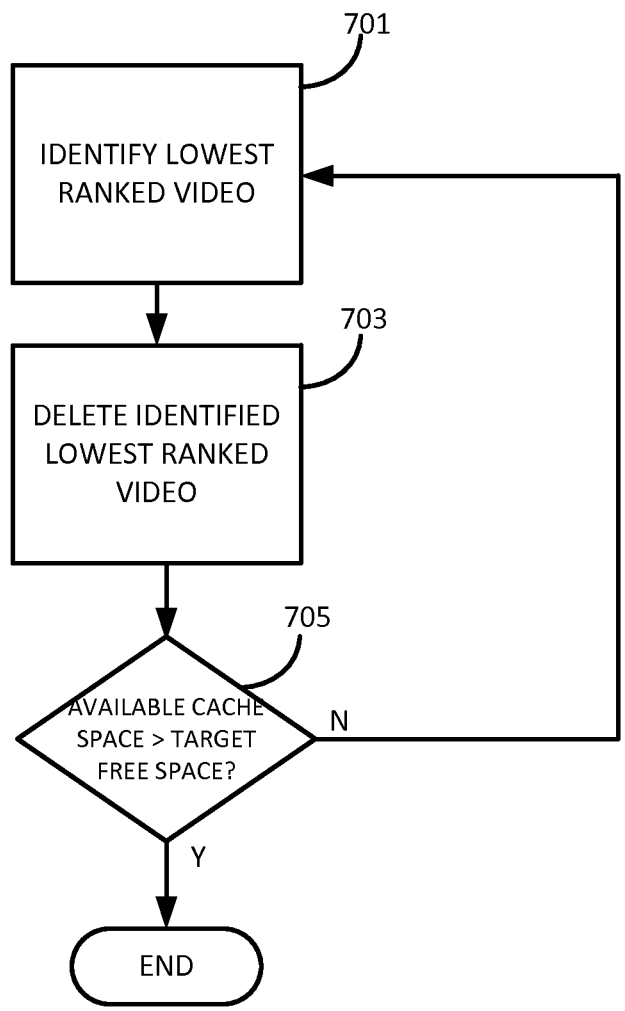
FIG. 7 is a flowchart of blocks for maintaining the video cache, according to a preferred embodiment of the present invention.

Periodic maintenance on the jukebox cache 11a may need to be performed to ensure there exists enough hard drive space in the jukebox cache 11a for the most popular videos. Turning now to FIG. 7, an exemplary method for such periodic maintenance, is illustrated. At block 701, the video cache selection process, as described in connection with FIG. 3, is initiated to identify the lowest ranked video from the cached videos selection list. At block 703, the lowest ranked video (and any associated image file) is deleted from the video cache hard drive. At block 705, the available hard drive space on the jukebox cache 11a is compared to a target free space size. The maintenance process is repeated until the amount of available hard drive space in the jukebox cache 11a is greater than the target free space size. Although not shown in FIG. 7, the video manifest on the content drive is updated by deleting any metadata associated with the videos deleted during the above described process, and a new hash code for the manifest on the content drive is generated and stored.

Video Image Download

Images may also be associated with the videos played on a jukebox. A missing image retrieval technique may be employed to retrieve missing images associated with songs and videos. For such missing images, certain criteria are used to determine whether such missing images should be downloaded to the jukebox cache. Such criteria include whether the missing video images for videos that have already had their video media files downloaded may be eligible for downloading, and if the above discussed cache timing criteria. If such criteria are met, the subject missing image will be downloaded into the jukebox cache 11a, and the network usage data related to the download is logged and dispatched to the network statistics handler. Alternatively, if one of the criteria is not met, downloads for the remaining missing video images will be deferred until a subsequent operation of the video image retrieval process. Subsequently, the manifest on the content drive is updated to include metadata for any images that were downloaded, and a new hash code for the manifest on the content drive is generated and stored.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for managing a plurality of videos associated with one or more of a plurality of communicably coupled digital jukeboxes, the method comprising:
    ranking, by a first digital jukebox of the plurality of communicably coupled jukeboxes, the plurality of videos according to a predetermined criteria, the predetermined criteria including a popularity metric associated with the video, the popularity metric including a play frequency of media content, the media content including at least one of a song, an artist, and a genre related to the video, the predetermined criteria excluding any manual designation of ranking by any user of the first digital jukebox; and
    determining, by the first digital jukebox, whether to download into a temporary cache of the first digital jukebox, a video of the plurality of videos, based at least in part on the ranking of the video.

2. The method of claim 1, further comprising:
    in response to determining that the video is the highest ranked video not currently stored in the temporary cache, downloading the video into the temporary cache.

3. The method of claim 2, further comprising:
    prior to downloading the video into the temporary cache, determining an availability of free space in the temporary cache.

4. The method of claim 1, further comprising:
    in response to determining that the video is the lowest ranked video, removing the lowest ranked video from the temporary cache.

5. The method of claim 4, further comprising:
    prior to removing the lowest ranked video, determining if the temporary cache has reached a predetermined memory limit.

6. A method for managing a plurality of videos associated with one or more of a plurality of communicably coupled digital jukeboxes, the method comprising:
    ranking, by a first digital jukebox of the plurality of communicably coupled jukeboxes, the plurality of videos based at least in part on a popularity metric including a local popularity metric associated with each video and a network popularity metric associated with each video, the local popularity metric corresponding to a local play frequency of media content locally on the first digital jukebox, the network popularity metric corresponding to the play frequency of the media content on one or more second digital jukeboxes of the plurality of communicably coupled digital jukeboxes, wherein the media content includes at least one of a song, an artist, and a genre related to each video, the ranking for each of the plurality of videos excluding any manual designation of ranking by any user of the first digital jukebox; and
    determining, by the first digital jukebox, whether to download into a temporary cache of the first digital jukebox, a selected video of the plurality of videos based at least in part on the ranking of the selected video.

7. The method of claim 6, wherein the local play frequency includes a number of plays of the selected video on the first digital jukebox, and wherein the network play frequency includes a number of plays of the selected video on the one or more second digital jukeboxes.

8. The method of claim 6, further comprising:
    in response to determining that:
        a used bandwidth during a billing period is below a threshold bandwidth; and
        the selected video is the highest ranked video not currently stored in the temporary cache,
    downloading the selected video into the temporary cache.

9. The method of claim 7, wherein the ranking is based at least in part on one or more video requests by a user of the first digital jukebox and one or more previous video requests by the user of the one or more second jukeboxes.

10. The method of claim 6, further comprising:
    in response to determining that:
        a used bandwidth during a billing period is below a threshold bandwidth; and
        the selected video is the lowest ranked video, removing the lowest ranked video from the temporary cache.

11. The method of claim 9, further comprising:
    prior to removing the selected video, determining if the temporary cache has reached a predetermined memory limit.

12. The method of claim 6, further comprising adjusting the popularity metric, wherein the adjusted popularity metric is based at least in part on a ratio of the local play frequency of the genre of the media content to the network play frequency of the genre of the media content.

13. A first digital jukebox for managing a plurality of videos associated with one or more of a plurality of digital jukeboxes communicably coupled to the first digital jukebox, the first digital jukebox comprising:
    a temporary cache configured to store one or more of the plurality of videos; and
    a processor configured to:
        rank the plurality of videos according to a predetermined criteria, the predetermined criteria includes a popularity metric associated with the selected video, the popularity metric including a play frequency of media content, the media content including at least one of a song, an artist, and a genre related to the selected video, the predetermined criteria excluding any manual designation of ranking by any user of the first digital jukebox; and
        determine whether to download into the temporary cache, a selected video of the plurality of videos based at least in part on the rank of the video.

14. The first digital jukebox of claim 13, wherein the processor is further configured to download the selected video into the temporary cache if the video is the highest ranked video.

15. The first digital jukebox of claim 14, wherein the processor is further configured to determine an availability of free space in the temporary cache prior to downloading the highest selected video into the temporary cache.

16. The first digital jukebox of claim 13, wherein the processor is further configured to download the selected video into the temporary cache if the selected video is the lowest ranked video.

17. The first digital jukebox of claim 16, wherein the processor is further configured to determine if the temporary cache has reached a predetermined memory limit prior to removing the selected video from the temporary cache.

18. The first digital jukebox of claim 13, wherein the popularity metric includes at least one of a local popularity metric of the selected video and a network popularity metric of the video, the local popularity metric corresponding to a local play frequency of the media content locally on the first digital jukebox, and the network popularity metric corresponding to a network play frequency of the media content on the one or more second digital jukeboxes.

* * * * *